United States Patent [19]

Crawford et al.

[11] Patent Number: 4,921,092
[45] Date of Patent: May 1, 1990

[54] COMPUTER CONTROLLED NON-CONTACT FEEDER WITH SPACE-CONTROL DEVICE RESPONSIVE TO ITEM-SENSING DEVICE

[75] Inventors: Donald C. Crawford, Green Bay; Jeffrey L. Ross, Pulaski; James W. Krueger, Green Bay, all of Wis.

[73] Assignee: FMC Corporation, Chicago, Ill.

[21] Appl. No.: 133,216

[22] Filed: Dec. 17, 1987

Related U.S. Application Data

[63] Continuation of Ser. No. 792,085, Oct. 28, 1985, abandoned.

[51] Int. Cl.⁵ .............................................. B65G 47/26
[52] U.S. Cl. .................................. 198/460; 198/575; 198/577
[58] Field of Search ....................... 198/444, 459–462, 198/572–575, 577, 579; 364/478, 479

[56] References Cited

U.S. PATENT DOCUMENTS

| 3,075,630 | 1/1963 | Fisk | 198/572 |
|---|---|---|---|
| 3,251,452 | 5/1966 | Conway et al. | 198/460 |
| 3,485,339 | 12/1969 | Miller et al. | 198/460 |
| 4,360,098 | 11/1982 | Nordstrom | 198/460 X |
| 4,514,963 | 5/1985 | Bruno | 198/460 X |
| 4,518,075 | 5/1985 | Aykut et al. | 198/461 X |
| 4,604,704 | 8/1986 | Eaves et al. | 198/460 X |

FOREIGN PATENT DOCUMENTS

| 0127459 | 12/1984 | European Pat. Off. | |
| 0133861 | 11/1978 | Japan | 198/460 |
| 0002521 | 1/1980 | Japan | 198/460 |
| 0044489 | 3/1980 | Japan | 198/460 |
| 0160814 | 10/1982 | Japan | 198/460 |
| 1412679 | 11/1975 | United Kingdom | |
| 2041863 | 9/1980 | United Kingdom | |

*Primary Examiner*—Robert J. Spar
*Assistant Examiner*—Lyle Kimms

[57] ABSTRACT

A non-contact article feeder takes randomly spaced articles and places these articles in proper spacing and timing for transfer to a wrapping machine without the use of tie downs or guide rails. A plurality of flat belt conveyors connected in series open or close gaps between adjacent articles and deliver the articles at proper phase and proper velocity to flights of a conveyor of a wrapping machine. A computer monitors the articles to provide synchronization of individual conveyor belts and between the feeder and the wrapping machine.

8 Claims, 15 Drawing Sheets

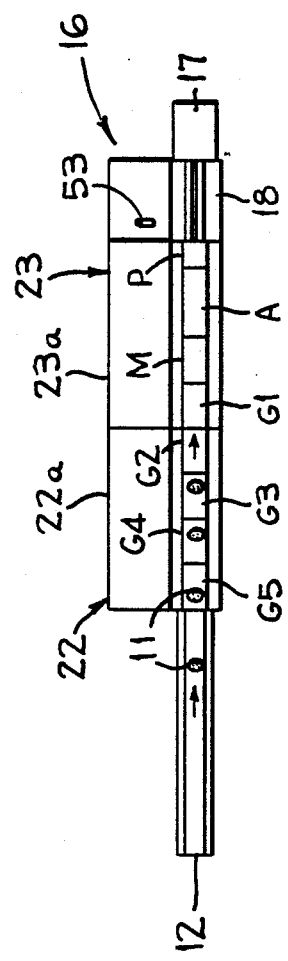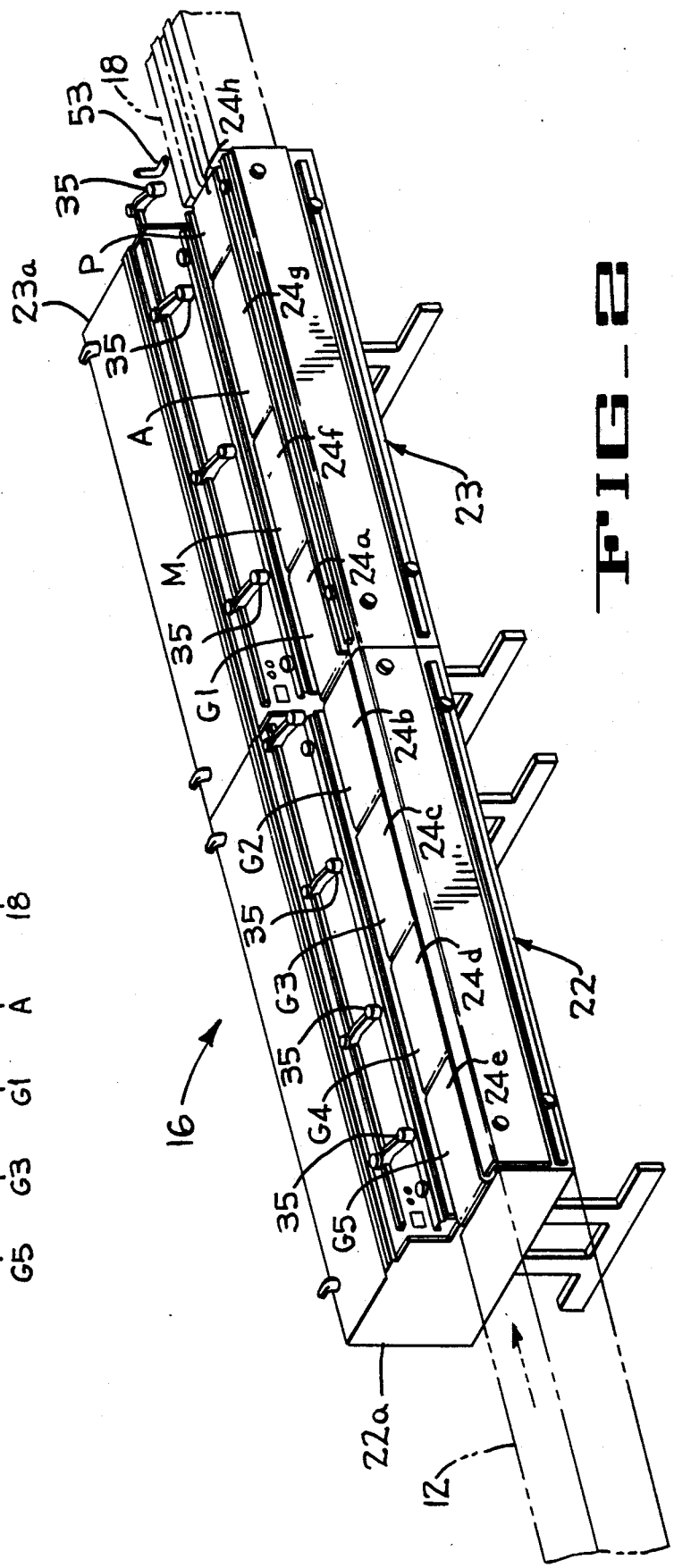

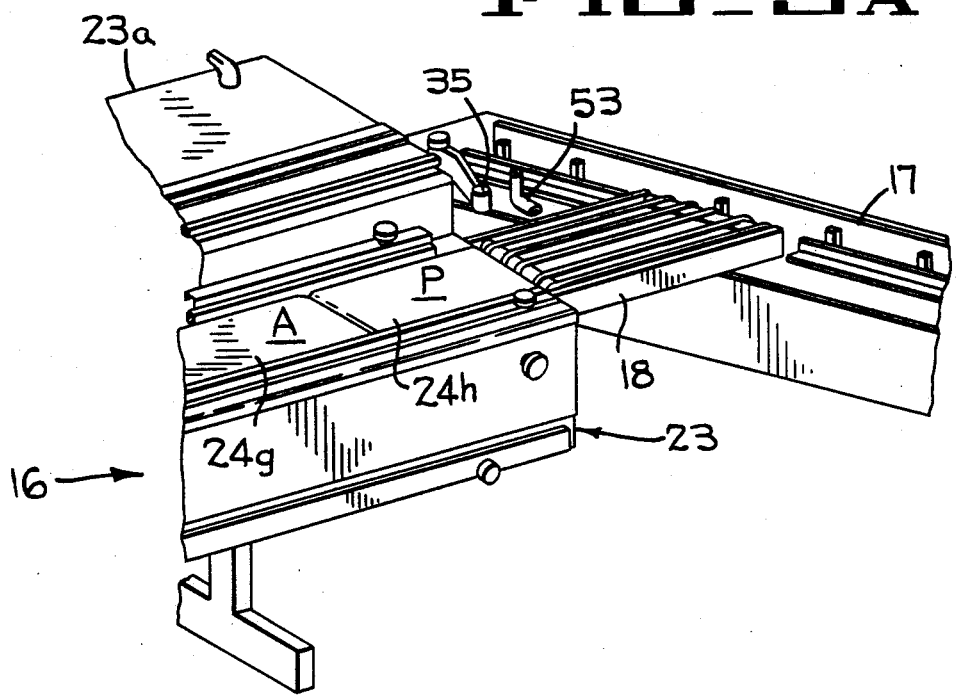
FIG_3A
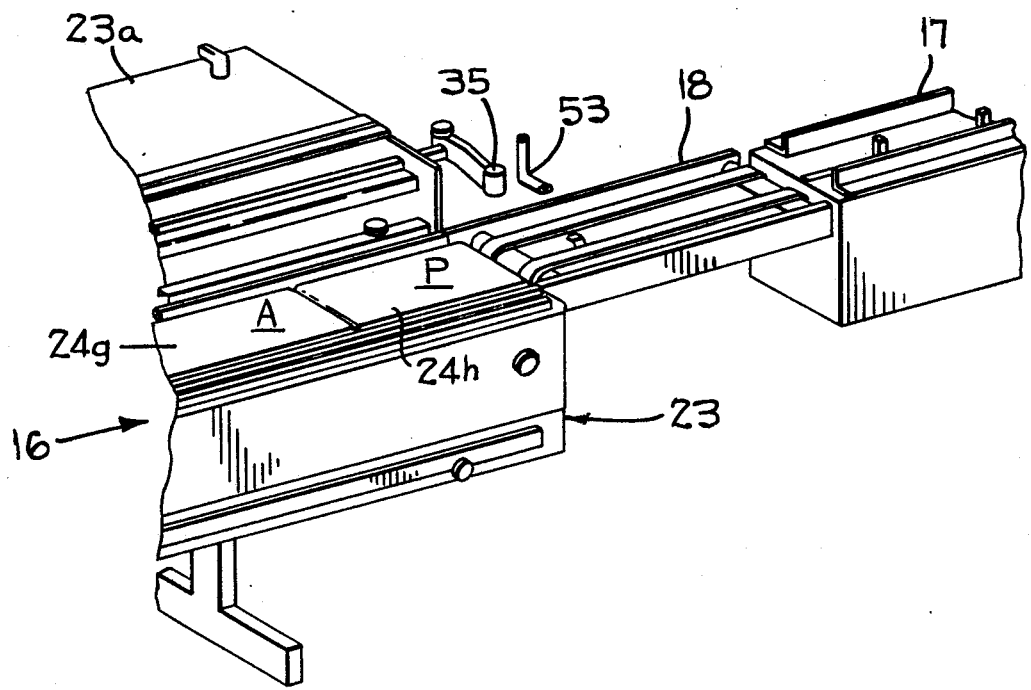
FIG_3B

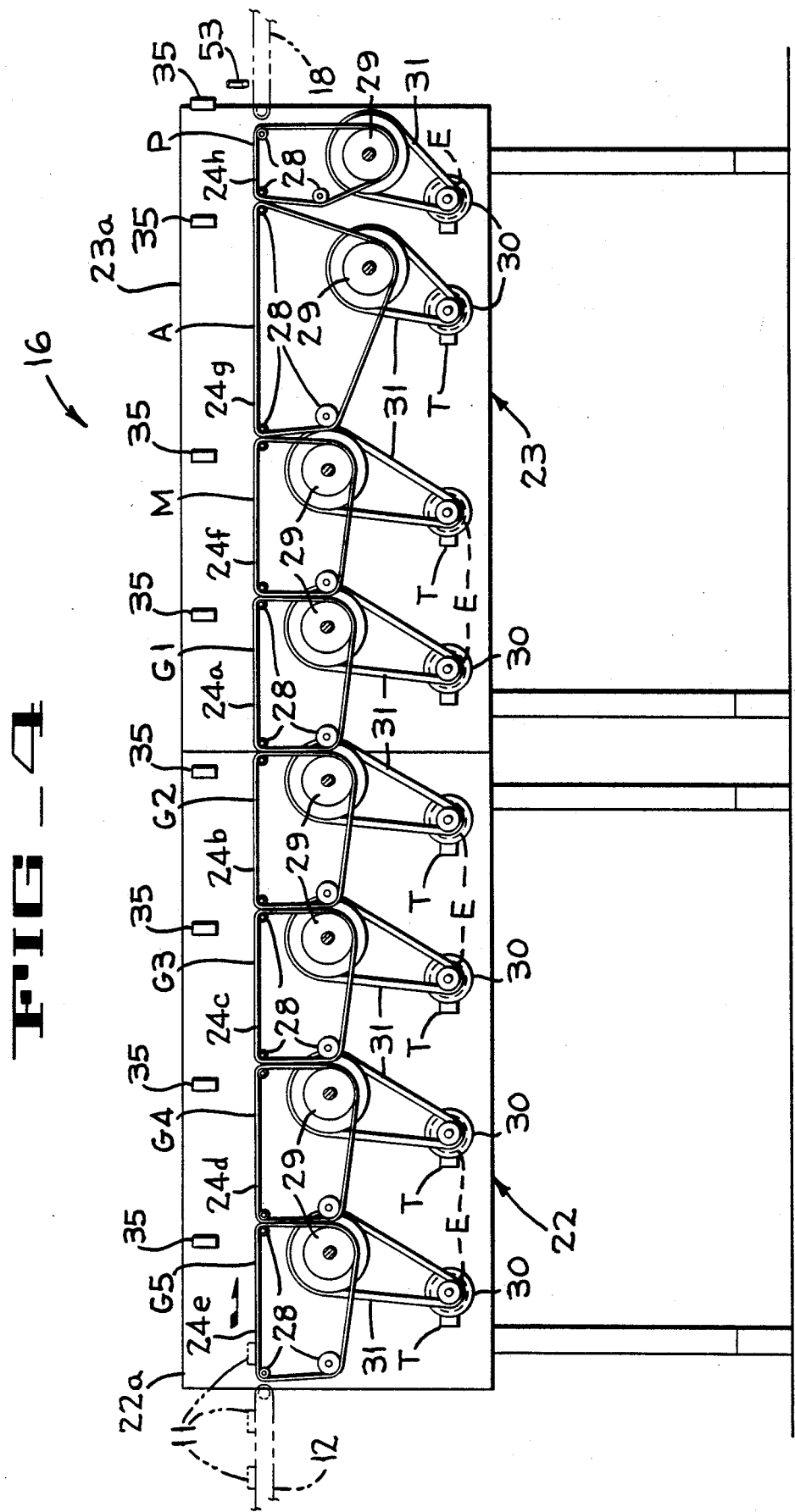

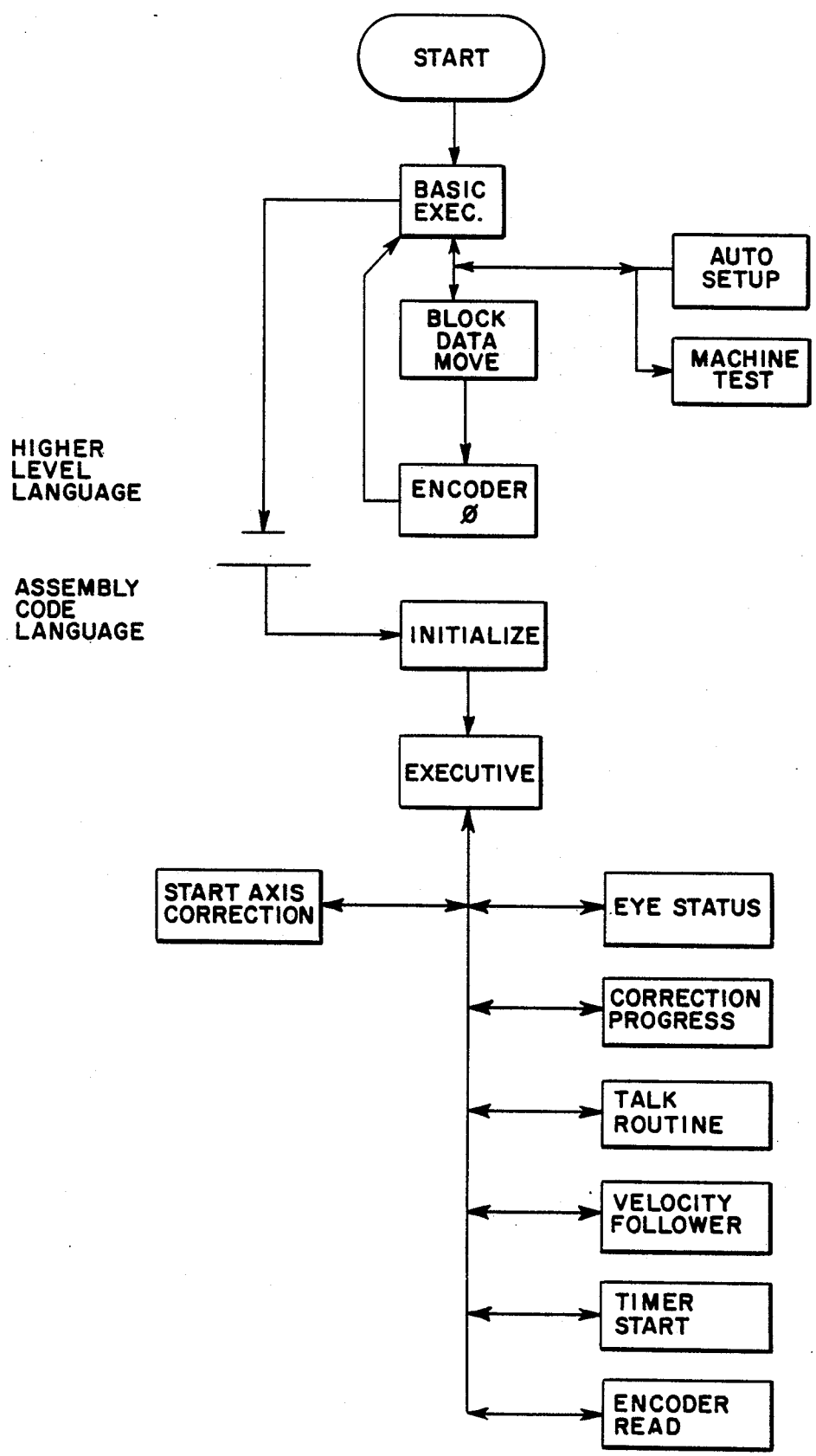
FIG_6

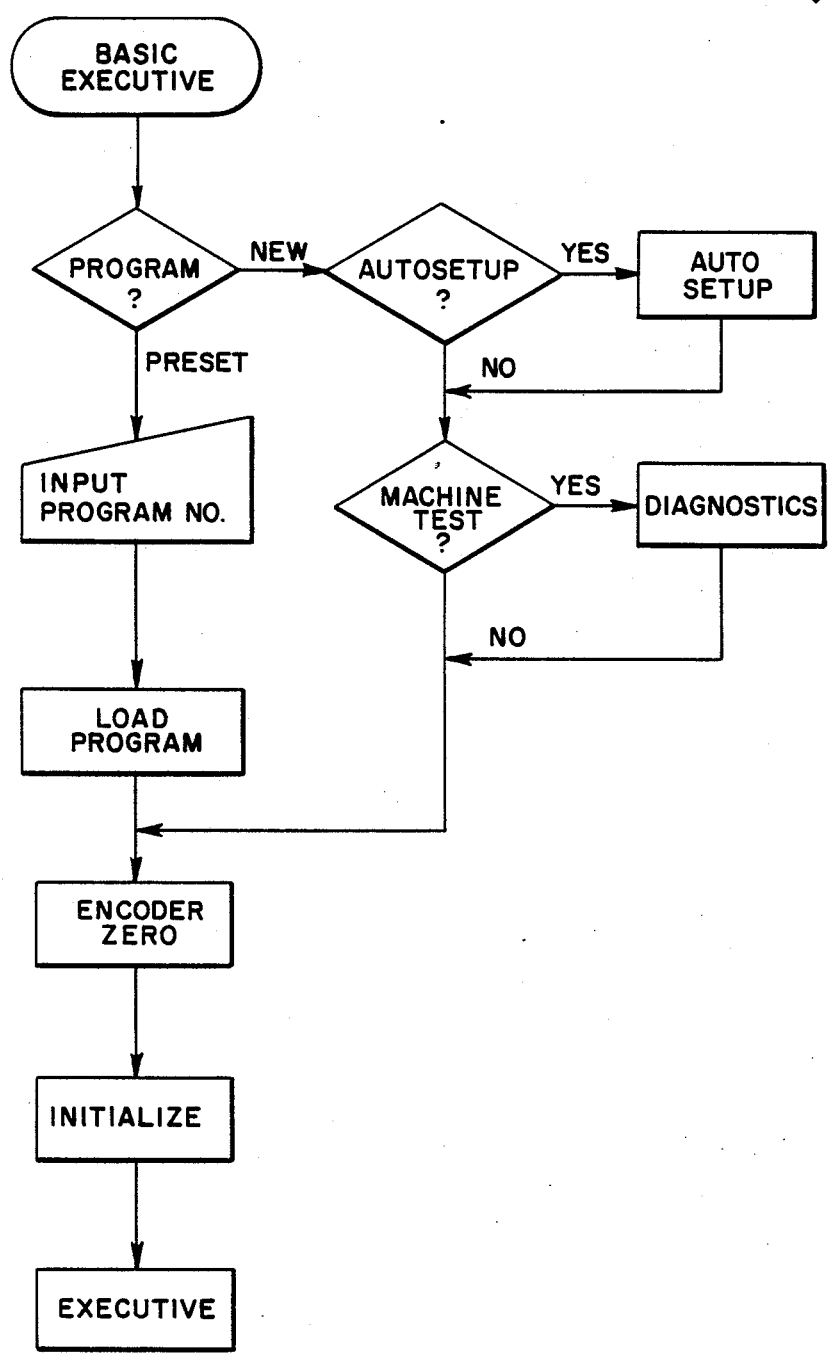
FIG_7

FIG_8
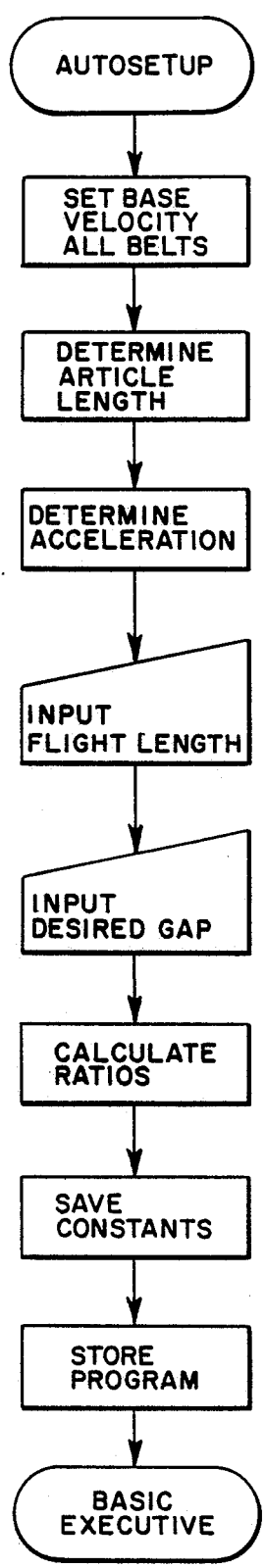
FIG_9
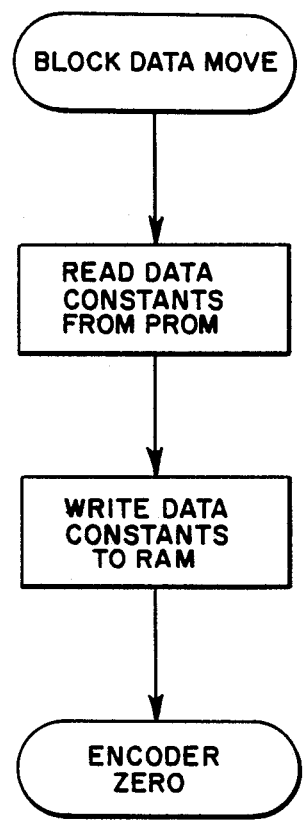

FIG_10
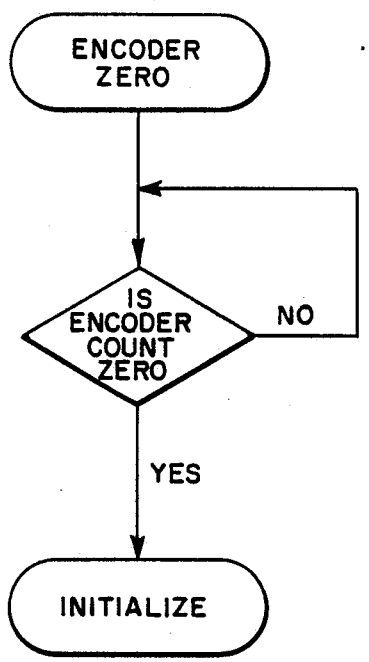
FIG_11
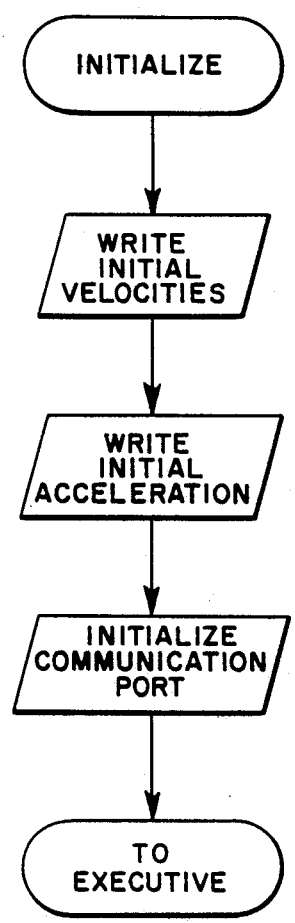

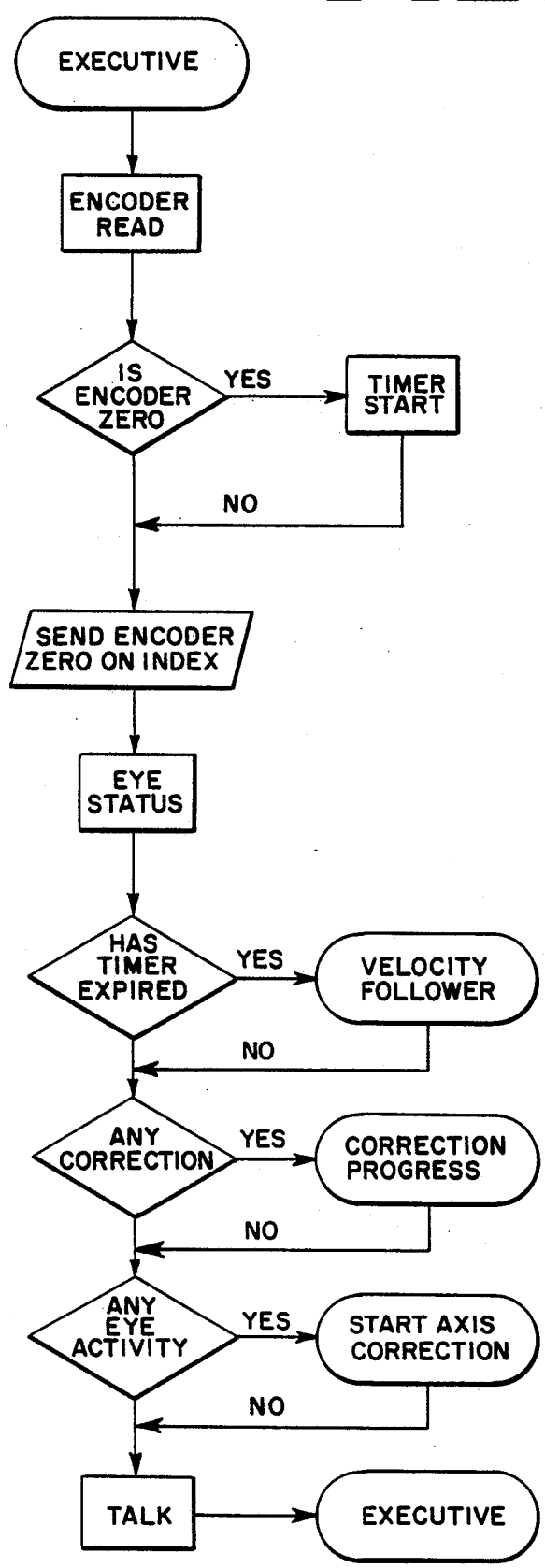
FIG_12

FIG_13
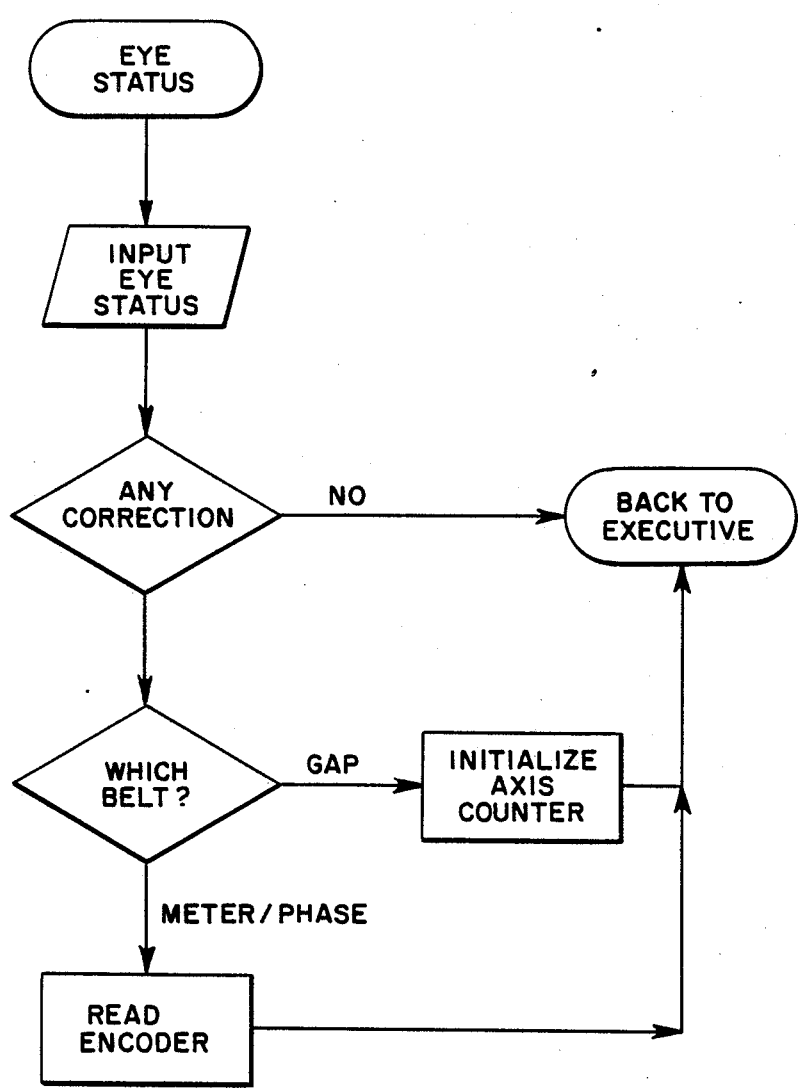

FIG_14
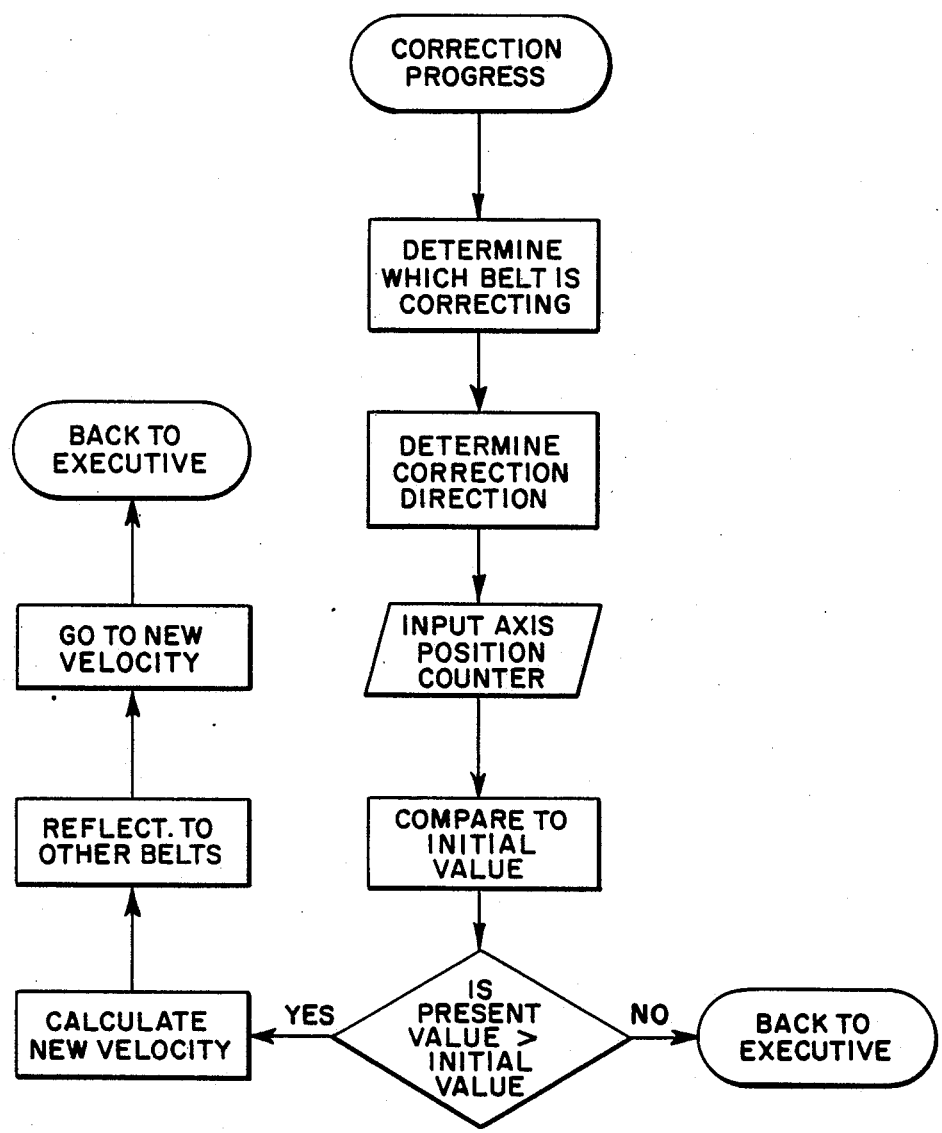

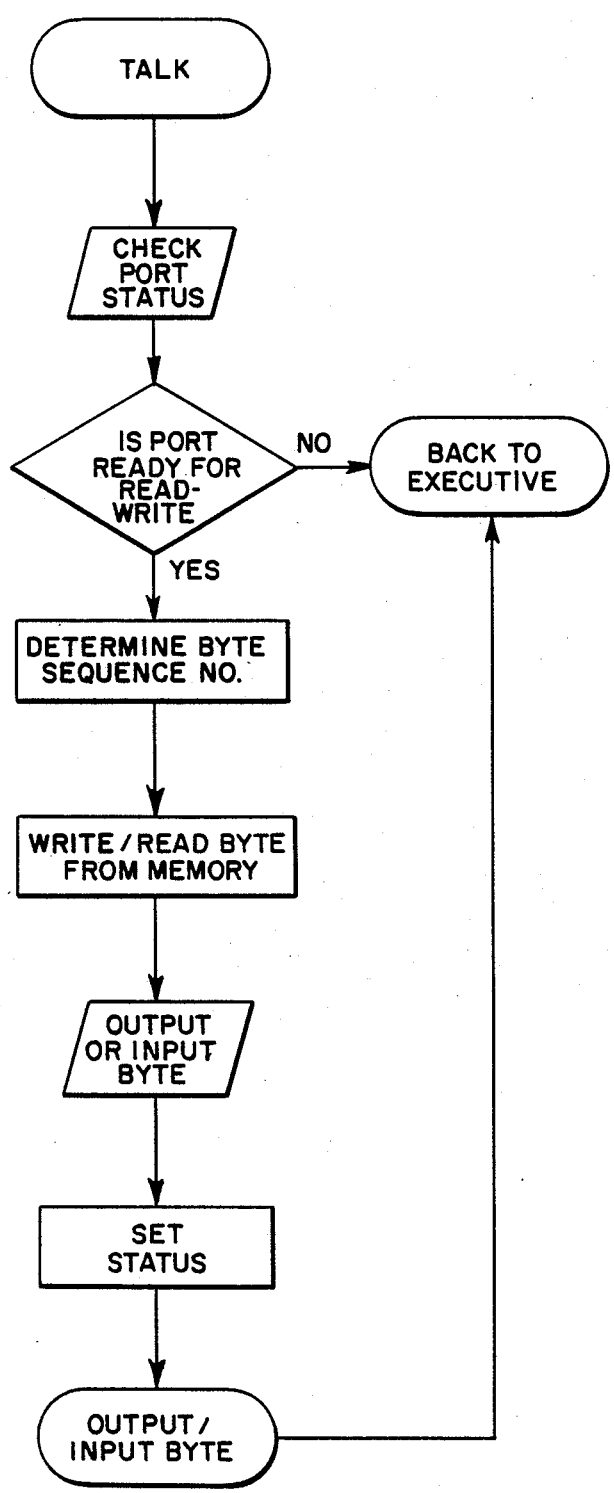
FIG_15

FIG_16
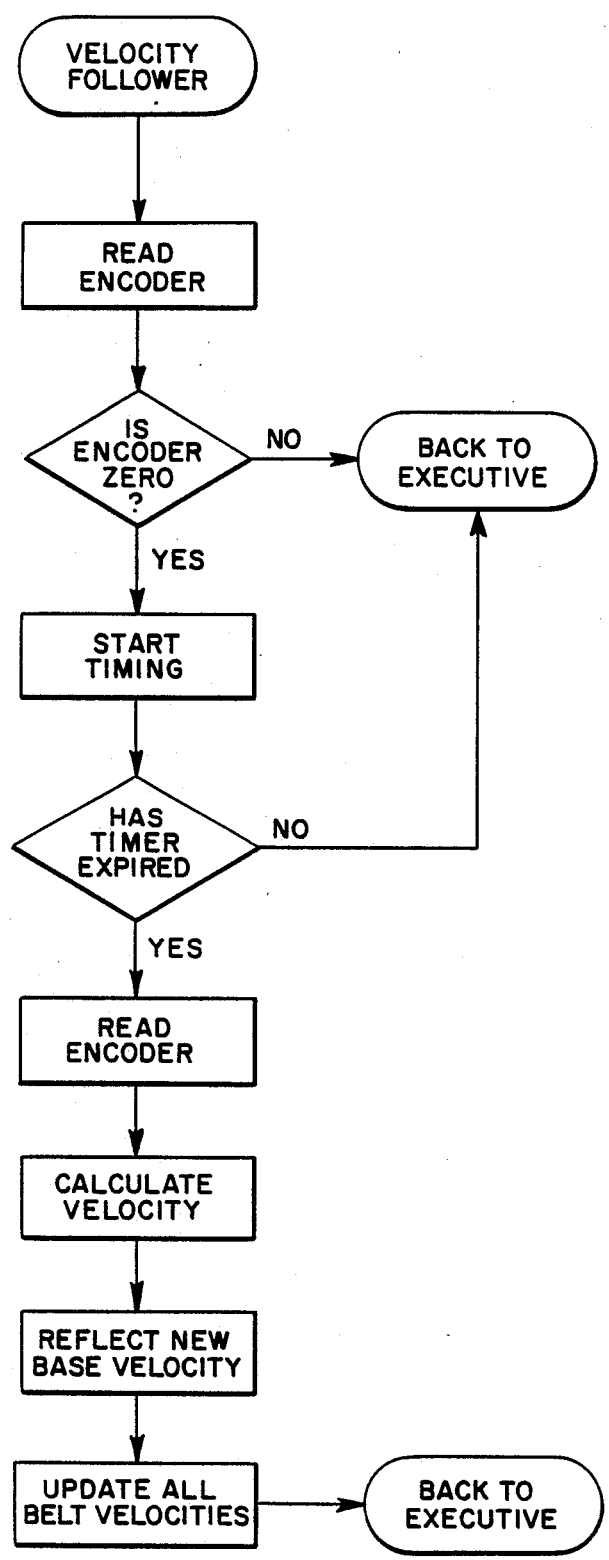
FIG_17
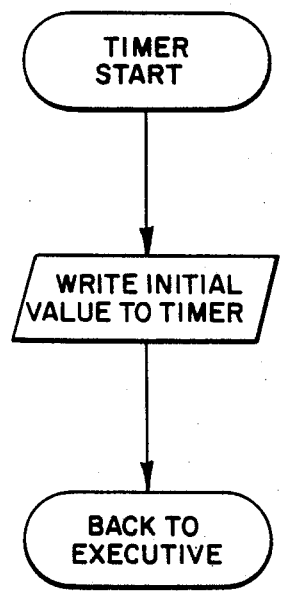

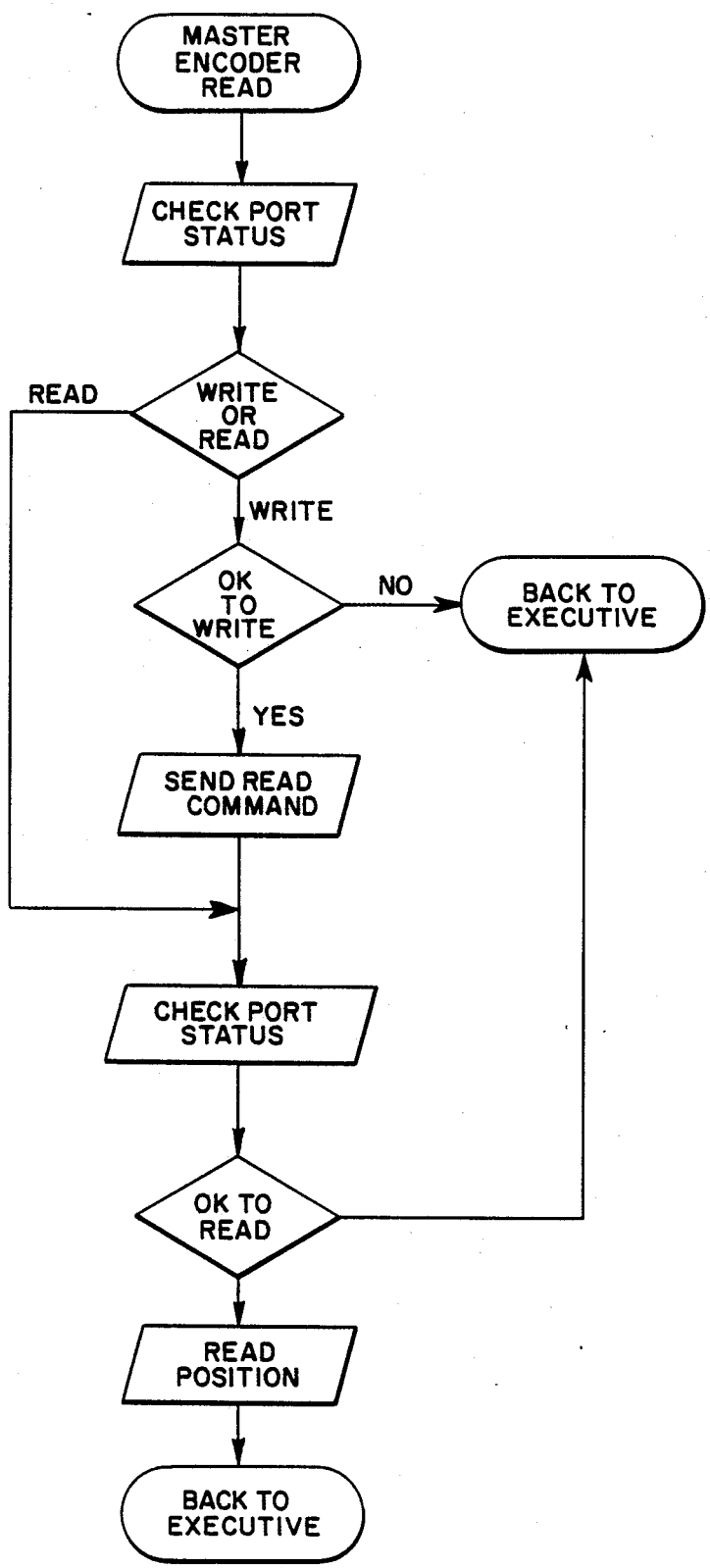
FIG_18

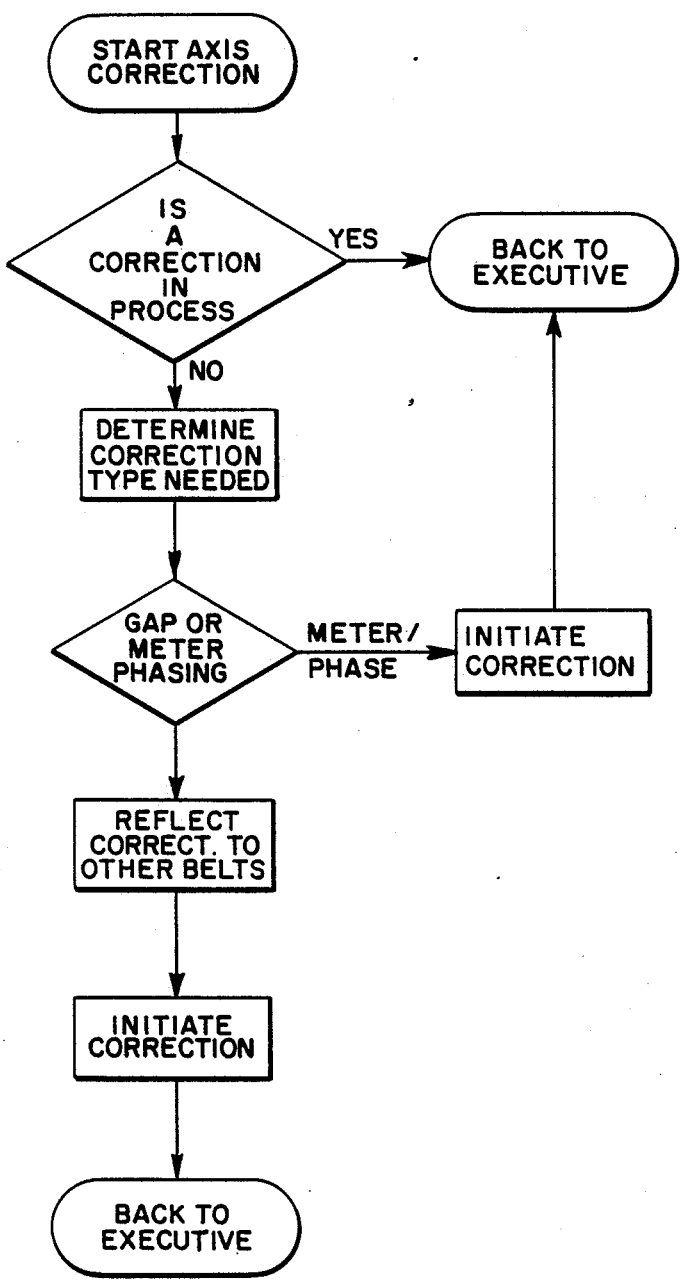
FIG_19

4,921,092

COMPUTER CONTROLLED NON-CONTACT FEEDER WITH SPACE-CONTROL DEVICE RESPONSIVE TO ITEM-SENSING DEVICE

This application is a continuation of application Ser. No. 06/792,085, filed 10/28/85, now abandoned.

BACKGROUND OF THE INVENTION

The present invention relates to apparatus for automatically feeding articles into an article processing machine, and more particularly, to apparatus for continuously correcting the positions of randomly spaced articles and transferring the articles with proper timing into the preceding conveyor of a horizontal wrapping machine.

Horizontal wrapping machines commonly use conveyors to feed a series of longitudinally spaced articles to a wrapping portion where one or more of the articles are placed into each wrapped package. Such wrapping machines conventionally are used with a feeder which receives abutted articles from a supply conveyor and separates these articles into a predetermined spaced and timed relation relative to the wrapping machine receiver conveyor. The feeder usually includes an article accumulation conveyor which operates at a high speed so that a back log of articles from the supplier conveyor are accumulated at the feeding station. Such a feeder may not work satisfactorily when sticky articles become abutted on the accumulation conveyor as the sticky articles are not separated properly in the feeding action.

SUMMARY OF THE INVENTION

The present invention provides a non-contact feeder which takes randomly spaced articles which are not abutted and places these articles in proper spacing and timing for transfer to a receiving conveyor of a wrapping machine. The present invention includes a series of flat belt conveyors which are individually driven by servo motors. These motors are automatically controlled to open or close gaps between articles and to provide article timing relative to the receiving conveyor of a wrapping machine. The speed of each individual article can be periodically regulated to provide a predetermined spacing between the adjacent articles, and the speed of each individual article can be periodically adjusted to properly time the article relative to the receiving conveyor of the wrapping or other article processing machine.

Since the articles do not abut, even articles which are highly cohesive, or tend to shingle, or are damaged by compression, or tend to interleave when accummulated, or articles which have irregular shapes can be fed in proper phase to the wrapper by the present invention. The control system can be adapted to feed articles of different lengths. The control system can monitor the rate of incoming articles and control the feeder and wrapping machine speed to maintain a backlog of spaced apart articles within preset limits, and can start and stop automatically in response to the starting and stopping of article supply. Articles which may be randomly supplied in abutted relationship with one another can also be spaced apart by the feeder of the present invention.

BRIEF DESCRIPTION OF THE DRAWINGS

FIG. 1 is a plan view of apparatus for automatically feeding a horizontal wrapping machine using the present invention.

FIG. 2 is an isometric view of a nonabutting feeder of the present invention.

FIGS. 3A, 3B illustrate transfer modules for transferring articles between a feeder of the present invention and a horizontal wrapping or other article processing machine.

FIG. 4 is a longitudinal section of the non-abutting feeder illustrating arrangements of motors and conveyor belts used in transporting articles along the feeder.

FIGS. 6–19 are flow charts which explain the operation of the control circuitry of FIG. 5.

DESCRIPTION OF THE PREFERRED EMBODIMENT

Figure 5:
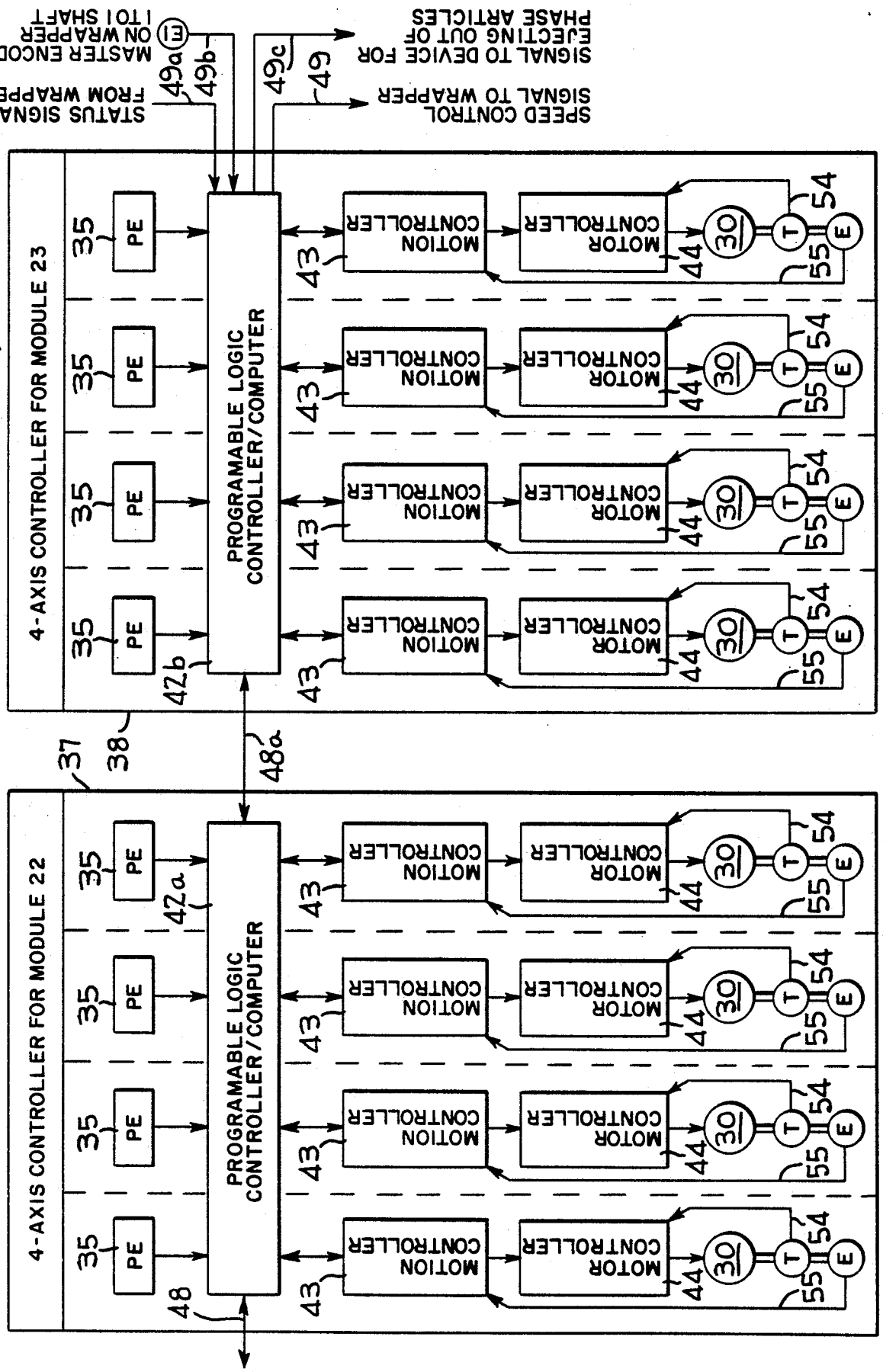
FIG. 5 illustrates a block diagram of circuitry for controlling operation of the nonabutting feeder of the present invention.

An automatic wrapping system disclosed in FIG. 1 includes an article supplier conveyor 12 which supplies randomly spaced articles 11 to a feeder module 16 which adjusts the distance between the articles so the articles 11 are evenly spaced and delivered to a wrapping machine 17 at a speed equal to the speed of the receiving conveyor. A transfer conveyor 18 (FIGS. 1, 3A, 3B) enables the articles 11 to be delivered to a receiving conveyor of the wrapping machine 17 (FIG. 3B) which is aligned with the feeder module 16, or to a wrapper receiving conveyor (FIG. 3A) which is at an oblique angle to the feeder module 16. A similar transfer conveyor (not shown) can be used to transfer articles to a wrapper conveyor at right angles to the feeder module. Several other types of transfer apparatus could be connected between the wrapper conveyor and the feeder module 16.

The feeder module 16 (FIGS. 1, 2, 4) includes a gap altering module 22 and a phasing module 23 connected in series. Modules 22, 23 include a plurality of gap altering conveyors G1–G5, a metering conveyor M, an accelerating conveyor A and a phasing conveyor P. Gap altering conveyors G5–G1 continuously open or close gaps between the articles 11 as these articles are conveyed from the supply conveyor 12 in response to electronic circuitry mounted in a cabinet portion 22a, 23a of the modules 22, 23.

Each of the conveyors G1–G5, M, A, P (FIGS. 1–4) includes a wide flat belt 24a–24h mounted on a plurality of rollers 28 (FIG. 4) and which is accelerated by a drive roller 29 which is driven by a motor 30 and a drive belt 31. Rotational position of each motor 30 is monitored by an associated encoder E and motor speed is monitored by a tachometer T (FIGS. 4, 5). Each of the rollers 28 and drive rollers 29 is slightly crowned with a smaller diameter portion at each end so the belts 24a–24h are automatically centered relative to the ends of the rollers. Because the articles do not have to be abutted no hold downs or side guides are required to constrain the articles. This minimizes damage to delicate articles and facilitates the movement of irregularly shaped articles along the belts. The rollers 28, 29 contact only the inside portions of the belts 24a–24h so article residue on the conveyor belts does not accummulate on the rollers. Collection tubs can be placed on the floor under the conveyors to collect loose particles that fall from the belts. The belts can be easily removed for clean up or for belt replacement. An individual servo drive motor for each belt provides highly responsive independent control of each conveyor module. The presence or absence of articles 11 is detected by a photocell 35 mounted above each of the conveyors G1-G5, M, A, P (FIGS. 2, 4, 5). Signals from the photoelectric cells 35 are coupled to a control circuit 36 (FIG. 5) which controls speed of the individual motors 30 and their associated belt conveyors (FIGS. 4, 5) to control the spacing and timing of the articles 11.

Gap altering conveyors G5-G1 are continuously velocity corrected to reposition articles 11 to achieve relatively small and uniform gaps between the articles. Conveyor M is continuously velocity corrected to time each of the now closely spaced articles relative to the flights of the receiving conveyor 17 (FIG. 1) of the horizontal wrapper. This correction is such that after the individual articles are accelerated by conveyor A (FIGS. 1, 2, 4) to a velocity match with the wrapper receiving conveyor they will be properly timed with respect to its flights. Conveyor A accelerates the articles, but does not make any correction to article positions. Conveyor P provides a final correction to compensate for any frictional errors that might be generated by the speed up transfer from conveyor M to conveyor A. Thus, the feeder employs two corrections of article timing relative to the wrapping machine. The junction between conveyor A and conveyor P is incrementally positionable to appropriately size conveyor P relative to article lengths so that each article can receive individual velocity corrections without effecting the velocity/positions of adjacent upstream or downstream articles.

The number of gap altering conveyors required for a given feeding application depends upon; (1) the uniformity of spacing between articles being supplied to the feeder, (2) the acceleration possible without slippage between articles and conveying means, and (3) the base speed of the article supply rate. The number of gap altering conveyors can be increased or decreased according to individual requirements. Numerous other types of conveyors can be employed and controlled in the manner described.

The feeder control circuitry 36 (FIG. 5) includes a circuit module 37 for controlling operation of the gap altering module 22 (FIGS. 1, 2, 4) and a circuit module 38 for controlling operation of the phasing module 23. Each of the modules 37, 38 includes a master programmable logic controller or computer 42a, 42b for controlling operation of the motors 30 on the corresponding modules 22, 23 in response to signals from the wrapping machine 17 and the photoelectric cells 35. One such master controller which can be used in the present invention is the Model 8088 which is manufactured by several companies. The master logic controllers 42a, 42b provide control signals to and receive signals from a plurality of axis motion controllers 43 which in turn receive rotational speed and position signals from the shaft encoders E. Motion controllers 43 each provide control signals to a servo motor controller 44 which supplies power for driving the corresponding servo motor 30. One motion controller 43 which can be used in the present invention is the microprocessor Z-80A which is manufactured by several companies. One servo motor controlled 44 which can be used in the present invention is the pulse width modulated (PWM) type available from several supply companies. A shaft encoder E which can be used in the present invention is the Model 80/80EM manufactured by Motion Control Devices, Inc. of Lowell, Mass.

A signal from logic controller 42a (FIG. 5) may be transmitted over a lead 48 to additional gap altering modules if they are needed to insure proper spacing of articles or, alternatively the number of gap altering conveyors on the gap altering module 22 (FIGS. 1, 2, 4) may be greater or less than four depending on the application.

Lead 48a is a communication link between logic controller 42a and 42b. Lead 49a communicates the wrapper machines status signals to logic controller 42b which also receives the lead 49b wrapper velocity and position reference signals from a master encoder E1 on a one-to-one shaft of wrapping machine 17. Logic controller 42b continuously processes these input signals and continuously sends output control signals to the motion controllers of the M, A and P conveyors and thereby synchronizes these conveyors with the operation of the wrapping machine 17. Logic controller 42b also continuously processes status input signals from all scanners 35 and continuously sends an output signal over lead 49 to automatically control the rate of wrapping machine 17 and thereby to automatically maintain the backlog of spaced articles 11 within preset limits. Lead 49c transmits a signal from logic controller 42b to a device for ejecting occasional out-of-phase articles which might occur under transient conditions such as emergency stops, rapid starts, etc. A blast of air from a jet 53 (FIGS. 1-3B) is used to eject out-of-phase articles from transfer conveyor 18.

The signal from the encoder E1 (FIG. 5) on the wrapping machine insures proper timing operation of the feeder 16 relative to operation of the wrapping machine, and signals from the encoders E provide accurate measurement of movement of each of the conveyor belts. A pair of leads 54, 55 from the encoders E and tachometers T provide closed loop operation of computers 43 and motor controllers 44 to control conveyor belt accelerations and insure maximum performance without slippage problems. The encoders E provide up to 100 counts per revolution so they provide very accurate timing which is especially good for low wrapping rates on the feeder.

The control system (FIG. 5) of the present invention may be programmed to provide for feeding "groups" of articles into flighted or unflighted receiving conveyors of wrapping or other article processing machines. Paired article "groups" for example would be obtained by programming the logic controller 42a to control gap altering conveyor velocity so as to produce a small or even zero gap between paired articles and a larger gap between paired article "groups". In this grouping application, the logic controller 42b would be programmed to meter and phase the paired article "groups" for properly timed transfer into the flighted or unflighted receiving conveyor wrapping machine. In this grouping application the control program would provide for little or no speed up in transfer of articles from conveyor M to conveyor A so that the gap between paired article within a "group" would remain relatively small.

The computers 42a, 42b use the velocity of an article over a period of time to calculate the acceleration of the article and can control the acceleration rate without slippage or tumbling problems. The computers use "look up tables" to provide a change in velocity of the belt which is proportional to the speed at which the packing machine is running and which minimizes the occurrence of article transfers at unmatched conveyor velocities. For example, if conveyor G1 is speeded up all of the other conveyors G5–G2 must also speed up to correct article position so that transfer is at a matched velocity.

Preset programs can be loaded into the computers 42a, 42b and selected by either a selector switch or by a communication link with a remote computer such as a personal computer so a human operator can easily select proper speed, package size and groupings. Since the feeder and wrapping machine are linked together the machines are appropriately synchronized. Since the wrapping machine supplies a timing signal from encoder E1 to the feeder no printed marks are required on conveyors or on wrappers to synchronize the two machines. The leading edges of articles 11 are sensed and timing circuitry can be used to determine whether the individual conveyor belt should be speeded up or slowed down. The feeder can open a gap between two successive articles, and can open the proper gap even between articles that may be randomly supplied in abutted relationship with one another.

The feeder uses computers 42a, 42b to control the motion controllers 43 and the motor controllers 44 so that the velocity of the articles being transferred matches the speed of the conveyor to which they are transferred and thus minimizes article damage and build up of article residue on the conveyor belts of the feeder.

The feeder follows, within preset limits, the rate of supply of incoming articles to the most upstream gap altering belt. If the article supply rate increases the feeder rate also increases and if the article supply rate decreases the feeder rate also decreases.

The feeder sends a rate control signal to the wrapping machine to command it to operate at the same rate as the feeder. If the non-contacting articles in backlog on the feeder are detected as being spaced too close together the feeder will increase the rate signal to the wrapping machine by a preset amount until the spacing between the articles reaches normal. If the non-contacting articles in backlog on the feeder are detected as being too far apart the feeder will decrease the speed control signal to the wrapping machine by a preset amount until the spacing between the articles reaches normal.

The gap altering conveyors are utilized to provide uniform gaps between articles of equal length. If the articles are not of equal length, the gap between articles will not be uniform but the distance from the leading edge of an article to the leading edge of an adjacent article will be uniform.

The gap altering conveyors have three modes of operation:

(a) Following Mode.

During this mode of operation the gap altering conveyor belt follows the velocity of the downstream conveyor belt. No corrections are made to the articles on the gap altering belt in this mode. The computer commands the following mode whenever an article passing the associated gap altering belt article detection scanner is detected as being properly spaced or whenever product is in the process of crossing the junction to the next downstream conveyor belt.

(b) Gap Closing Correct Mode.

The computer commands this mode whenever an excessive gap has been detected between the associated gap altering conveyor article detection scanner. The gap altering conveyor is then commanded to operate at a computer selected forward correction mode speed. The forward correction mode speed may optionally be determined by a computer algorithm. The algorithm determines the maximum speed from which the speeds can be accelerated to base feed speed (based upon packaging rate) at a preset deceleration during a movement of one-half the article length.

The gap altering conveyor will continue to operate at correction speed until the associated article detection scanner sees the leading edge of the next succeeding article or until a maximum correction counter or timer has expired. The conveyor belt will then decelerate to match the velocity or velocity ratio of the adjacent downstream conveyor belt and enter the "following mode".

(c) Gap Opening Mode.

The computer commands this mode whenever an insufficient gap has been detected by the associated conveyor's article detection scanner. The gap altering conveyor is then commanded to operate at a velocity equal to the present conveyor belt velocity minus the reverse correction differential velocity for a predetermined amount of belt movement or a predetermined amount of time. The computer will select automatically either belt movement or time as the terminating factor for the reverse correction. In some operational situations, better correction is obtained using a different terminating factor. When reverse correction is completed the conveyor belt will accelerate to match velocity or velocity ratio with the downstream conveyor belt. The "following mode" is again entered.

The feeder monitors an encoder or some other type of position/velocity transducer mounted on the packaging machine. The transducer information is used in conjunction with article position detectors associated with the metering M and fine phase P conveyors to determine the actual position error between the actual article position and the desired article position. A conveyor drive correction signal proportional to the measured error is implemented. This is accomplished by changing the velocity of the effected conveyor belt for a computer calculated machine or real time period. This action corrects the article position and the actual position error becomes less than a preset value.

The above described correction of article timing is first accomplished by the metering conveyor M and then after the articles have been accelerated by the accelerating conveyor A a final correction of the timing article is accomplished by the fine phasing converter P.

The acceleration conveyor A of the feeder is used only to accelerate the articles leaving the metering conveyor M. The articles are accelerated up to a velocity that matches the velocity of the packing machine receiving conveyor. The acceleration conveyor does not attempt to correct timing of the articles.

The feature of the present invention includes an automatic start-up mode which can be used only if the associated wrapping machine has an automatic start-up mode. When the wrapping machine is placed "on-line" in the automatic start mode the feeder is automatically armed. If articles are sitting on the feeder, as retained in the memory of computers 42a, 42b, the feeder sends a start signal to the wrapping machine and triggers the following operation:

1. The wrapping machine will sound an alarm and after a suitable time delay start operating at a speed as commanded by the feeder.

2. The feeder will monitor the velocity/position sensor such as encoder E1 on the wrapping machine and follow this machine as the speed increases.

3. The article supply to the most upstream gap altering conveyor will be monitored via the associated article detection scanner. This information is used to set the running base velocity of the feeder and the wrapping machine.

If articles are not sitting on the feeder as retained in computer memory, the feeder will operate as follows:

1. The feeder belts will be commanded to operate at a preset start up rate.

2. The most upstream gap altering conveyor belt product detection scanner will monitor the incoming supply rate to determine when a usable supply of articles is available at a fairly constant rate. Articles not falling into this category will be ejected off the transfer conveyor.

3. When a "usable" supply of articles has been detected, the feeder will command the wrapping machine to start at such a real time that the feeder will put an article into the first desired flight of the receiving conveyor of the wrapping machine, thereby preventing the creation of an empty package.

4. The article supply rate to the most upstream gap altering conveyor will be monitored via the associated product detection scanner. This information is used to set the running base velocity of the feeder and the wrapping machine.

If the article supply rate disappears or otherwise becomes too sporadic for use, this will cause the feeder to do the following:

1. The wrapping machine will be commanded to decelerate and stop.

2. The feeder will revert back to the "on-line" in the automatic start mode. During this automatic start and stop, any articles out of phase will be automatically ejected off the transfer conveyor.

Programs for operating the wrapping machine and the feeder can be stored in the computers 42a, 42b and the desired program selected by a remote computer over a communications link or the programs could be selected by an optional selector switch on the feeder control cabinet.

The program data would include such parameters as product length, desired gap between articles and desired acceleration.

The feeder has the capability of semi-automatically adjusting all article specific operational settings except the physical position of the product detection scanners and the physical length of the phasing conveyor P. The setup procedure is as follows:

a. Set the setup mode selector switch to the "setup" position.

b. Place the associated wrapping machine in the "auto start" mode.

c. The feeder will now command the wrapping machine to start and run at a preselected speed. The wrapping machine will sound an alarm and then will start.

d. The feeder will monitor the velocity/position transducer such as an encoder mounted on the wrapping machine receiving conveyor or a packaging material feed mechanism. The feeder will determine velocity and acceleration rate of the wrapping machine. The velocity is used to identify the setting of the base velocity ratios for the metering belt M, the acceleration belt A, and phasing belt P. The acceleration measured is used to match start up and shut down parameters between the feeder and the wrapping machine.

e. The wrapping machine is commanded to stop.

f. The feeder commands all feeder belts to operate at 5" per second.

g. One article is manually placed on the most upstream gap altering belt. The article travels on each conveyor past the associated product detection scanner 35. The scanners are used to measure the length of the article.

h. After all conveyors have scanned the article, all of them except for the most upstream gap altering conveyor will stop.

i. The length of the article measured is used to configure the gap and error sensing algorith automatically for the new article. The length measured is also used to automatically limit the maximum range of the packing machine speed control command generated by the feeder computer. The longer the article, the lower the allowable packing machine speed range.

j. An article is placed on the most upstream gap altering belt. The article will advance at 5" per second to the associated product detection scanner. This event starts all other downstream belts and allows them to operate at 5" per second. When the article detection scanner on the next conveyor sees the leading edge of the product, all conveyor belts are ramped up at one gravity acceleration to a velocity of 25" per second. When the next article detection scanner sees the article, all conveyor belts are ramped down at one gravity deceleration to a velocity of 5" per second. All conveyors continue ramping up and down until the article detection scanner on the last conveyor sees the article's leading edge. The computer measures the amount of time it took for the article to move from the most upstream gap altering conveyor article position sensor to the downstream fine phasing article positioning sensor P. The computer then compares actual time with ideal time. If these times deviate more than a preset amount, the acceleration of the belts will be reduced by a 0.1 gravity. Another article would then be manually placed on the most upstream gap altering belt. This sequence will be repeated until the actual time and the ideal calculated time are within preset limits, and the final acceleration value will be automatically stored in the computer. All belts will then be stopped.

k. The acceleration rate determined in step (j) is the highest rate for the specific article to permit minimal slippage during feeding. This automated procedure is basically measuring the article's coefficient of friction and/or the articles tendency to roll, whichever affects the maximum rate of acceleration.

l. Set the mode selector switch to the "operate" position.

m. Stop the associated wrapping machine.

The flow charts of FIGS. 6–19 illustrate in more detail the sequence of feeder operation described above and can be used in programming the feeder computers. An overview of the program for operating the feeder and wrapping machine is disclosed in FIG. 6, and FIGS. 7–19 each disclose detailed operation of a corresponding one of the blocks of FIG. 6. For example, the basic executive program which includes loading the program into the processor and checking the zero position of the encoder is disclosed in FIG. 7. The steps for automatic setup of the feeder are disclosed in FIG. 8.

The present invention is able to feed cohesive articles, irregularly spaced articles, delicate articles, articles which tend to shingle and articles which tend to interleave, all of which have been difficult to feed to wrapping and other types of article processing machines.

Although the best mode contemplated for carrying out the present invention has been herein shown and described, it will be apparent that modification and variation may be made without departing from what is regarded to be the subject matter of the invention.

What is claimed is:

1. A non-contact feeder for receiving randomly spaced nonabutting articles from a supply conveyor and for delivering said articles to a wrapping machine conveyor at a speed and at a spacing to match a flighted conveyor on said wrapping machine without said articles contacting one another, said feeder comprising:
   a plurality of conveyors mounted in series for receiving articles from said supply conveyor;
   a plurality of optical sensors;
   means for mounting each of said sensors adjacent a corresponding one of said conveyors for sensing the presence of an article on said corresponding conveyor;
   means for using signals from said sensors to sense the spacing between adjacent articles and to adjust the spacing between said articles as said articles move along said conveyors, said adjusting means including means for increasing the spacing between said articles when the spacing decreases below a first predetermined constant value and means for decreasing the spacing when the spacing increases above said first predetermined constant value; and
   means for using signals from said sensors to conform article speed and position to movement of said flighted conveyor on said wrapping machine.

2. A non-contact feeder as defined in claim 1 including computing means for receiving signals from said sensors and using said received signals to control the speed of said conveyors.

3. A non-contact feeder as defined in claim 1 wherein each of said conveyors includes a belt mounted on a plurality of rollers, and including a plurality of encoders for accurate measurement of conveyor belt movement, means for connecting each of said encoders to a corresponding one of said conveyor belts and means for connecting each of said encoders to said means for using signals, said signals using means adjusting speed of each of said conveyor belt in response to signals from said encoders and from said optical sensors.

4. A non-contact feeder as defined in claim 3 including means for mounting each of said rollers inside said belt where said rollers do not contact the surface of said belt that supports said articles.

5. A non-contact feeder for receiving randomly spaced nonabutting articles from a supply conveyor and for delivering said articles to a wrapping machine conveyor at a speed and at a spacing to match a flighted conveyor on said wrapping machine without said articles contacting one another, said feeder comprising:
   a plurality of gap altering conveyors mounted in series for receiving articles from said supply conveyor;
   a plurality of phasing conveyors mounted in series for receiving articles from said gap altering conveyors and delivering said articles to said wrapping machine conveyor;
   a plurality of optical sensors;
   means for mounting each of said sensors adjacent a corresponding one of said gap altering conveyors and said phasing conveyors for sensing the presence of an article on said corresponding conveyors;
   means for using signals from said sensors adjacent said gap altering conveyors to sense the spacing between adjacent articles and to adjust the spacing between articles, said adjusting means including means for increasing the spacing between adjacent articles when the spacing decreases below a first predetermined constant value and means for decreasing the spacing between adjacent articles when the spacing increases above said first predetermined constant value; and
   means for using signals from said sensors adjacent said phasing conveyors to conform article speed and position to movement of said flighted conveyors on said wrapping machine.

6. A non-contact feeder as defined in claim 5 including computing means for receiving signals from said sensors and using said received signals to control the speed of said conveyors.

7. A non-contact feeder as defined in claim 1 including means for continuously applying a space correcting signal until the spacing between articles has been corrected.

8. A non-contact feeder as defined in claim 1 including means for providing a backlog of non-contacting articles having a uniform spacing between adjacent articles, said backlog being provided by a plurality of conveyors adjacent said supply conveyor.

* * * * *